United States Patent [19]
Bennett

[11] 4,319,775
[45] Mar. 16, 1982

[54] PIPE COUPLING WITH INTERNAL STOP COLLAR AND ELASTOMERIC PIPE SEPARATORS INTERLOCKED THEREWITH

[75] Inventor: Joe B. Bennett, Conroe, Tex.

[73] Assignee: Owens-Corning Fiberglas Corporation, Toledo, Ohio

[21] Appl. No.: 71,612

[22] Filed: Aug. 31, 1979

[51] Int. Cl.³ .................. F16L 21/00; F16L 47/00
[52] U.S. Cl. ................................. 285/383; 285/369; 285/423
[58] Field of Search ............... 138/103, 114, 134, 150; 285/235, 236, 383, DIG. 12, 423, 369

[56] References Cited

U.S. PATENT DOCUMENTS

| | | | |
|---|---|---|---|
| 808,923 | 1/1906 | Herrick | 285/383 X |
| 2,669,465 | 2/1954 | Newell | 285/383 X |
| 2,900,200 | 8/1959 | Umstradter | 285/369 X |
| 3,179,445 | 4/1965 | Moretti | 285/383 X |
| 3,186,741 | 6/1965 | Kurtz | 285/383 X |
| 3,211,475 | 10/1965 | Freed et al. | 285/236 X |
| 3,376,055 | 4/1968 | Donroe | 285/236 |
| 4,213,641 | 7/1980 | Bennett | 285/383 X |

FOREIGN PATENT DOCUMENTS

| | | | |
|---|---|---|---|
| 853082 | 10/1970 | Canada | 285/235 |
| 705415 | 3/1954 | United Kingdom | 285/235 |
| 1365151 | 8/1974 | United Kingdom | 285/423 |

*Primary Examiner*—Thomas F. Callaghan
*Attorney, Agent, or Firm*—Ronald C. Hudgens; Kenneth H. Wetmore; Paul J. Rose

[57] ABSTRACT

Elastomeric pipe separators (14) are interlocked with an internal stop collar (10a) of a pipe coupling (10) to enable pipes (16 and 18) to be inserted as far as they will readily go into the pipe coupling (10) and yet allow for thermal expansion of the pipes (16 and 18) without damage to the pipes (16 and 18) or coupling (10).

3 Claims, 4 Drawing Figures

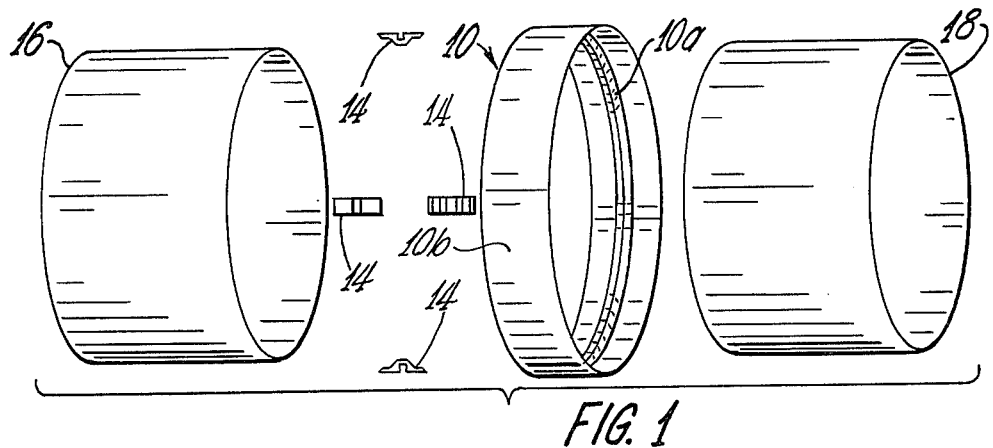
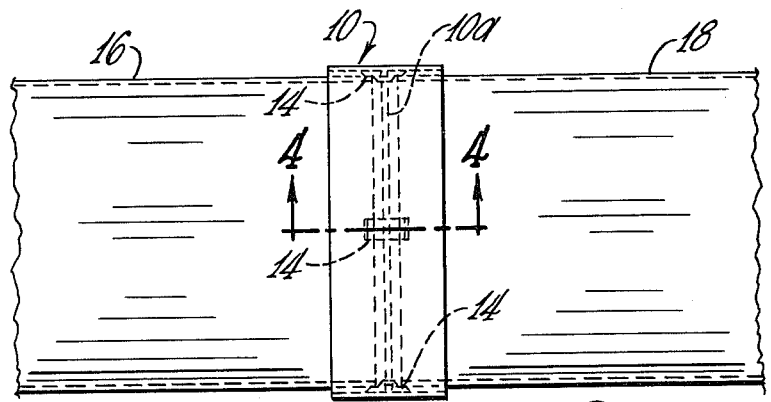
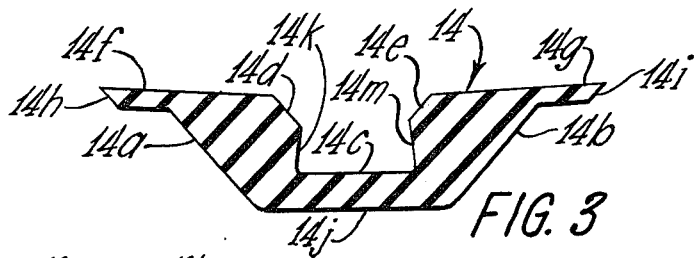
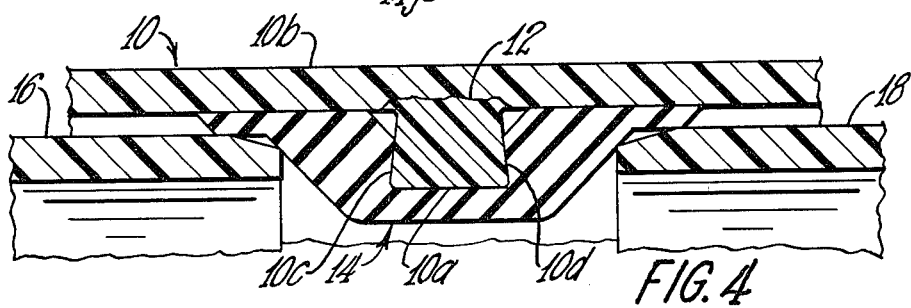

PIPE COUPLING WITH INTERNAL STOP COLLAR AND ELASTOMERIC PIPE SEPARATORS INTERLOCKED THEREWITH

TECHNICAL FIELD

This invention relates generally to pipe couplings, and more particularly to couplings for glass fiber reinforced plastic pipe of relative large diameter, for example, from six hundred to two thousand five hundred millimeters.

BACKGROUND ART

Pipe couplings for reinforced plastic pipe have been made with an internal stop collar midway between the end faces. Provision has been made to allow for axial expansion of pipe by inserting at least one of the pipes into a coupling only as far as a line marked on the pipe. There is always the possibility that both pipes may be inserted farther than the line marks whereby both pipes may be in contact with the internal stop collar without allowance for expansion.

DISCLOSURE OF INVENTION

The provision of elastomeric separators on the internal stop collar allows the pipes to be inserted into a coupling as far as they will go and provision is still made for axial expansion of the pipe.

BRIEF DESCRIPTION OF DRAWINGS

FIG. 1 is a schematic exploded perspective view of a pipe coupling constructed in accordance with the invention and end portions of two pipes;

FIG. 2 is a schematic elevational view of two pipe and portions assembled in a pipe coupling constructed in accordance with the invention;

FIG. 3 is a cross-sectional view of an elastomeric separator constructed in accordance with the invention, the separator being shown in a free-state shape before installation in a pipe coupling constructed in accordance with the invention; and FIG. 4 is an enlarged fragmentary cross-sectional view taken generally along the line 4—4 of FIG. 2.

BEST MODE OF CARRYING OUT INVENTION

FIGS. 1, 2 and 4 show a pipe coupling 10 constructed in accordance with the invention. The representation of the pipe coupling 10 in FIGS. 1 and 2 is schematic in the sense that it does not show internal annular grooves respectively adjacent opposite end faces for reception of sealing rings. Provision of grooves for sealing rings in pipe couplings is a matter well understood in the art as shown in my co-pending application, Ser. No. 865,561, filed Dec. 29, 1977, now U.S. Pat. No. 4,213,641.

The pipe coupling 10 is formed by continuously winding a resin-impregnated strand of glass filaments about a rotating cylindrical mold in a manner well known in the art. The first portion thereof to be formed is an internal pipe registering or stop collar portion 10a formed by winding filaments in a groove of a separable mold (not shown), until the groove is full and overflowing. A plastic film 12 is then wrapped around the portion 10a, and thereafter a main body portion 10b of the pipe coupling is formed by the continuous filament winding process. The plastic film 12 separates the stop collar portion 10a from the body portion 10b, whereby under certain conditions of use, if the collar portion 10a deteriorates due to stress corrosion, the body portion 10b will still be intact to maintain a good pipe joint. The portion 10a is made slightly oversize, by the overflowing of the groove during the winding process, in order to be retained in the body portion 10b.

In accordance with the invention, the stop collar portion 10a is provided with a generally trapezoidal cross section and having side surfaces 10c and 10d diverging radially inwardly of the pipe coupling. This provides an enlarged radially inner end portion on the collar portion 10a, for the retention of elastomeric pipe separators 14 thereon. The separators 14 are preferably made of natural rubber with a durometer hardness of about 60. In the embodiment shown, four separators 14 are provided and centered ninety degrees apart. At least three separators 14, centered one hundred twenty degrees apart, would be provided on couplings for pipe of six hundred mm. diameter. Couplings for larger pipe of two thousand four hundred mm. diameter, for example, preferably would have twelve separators 14 centered thirty degrees apart.

A cross section of an elastomeric pipe separator 14 in a free-state condition is shown in FIG. 3. The cross section of the separator 14 is generally trapezoidal, with sides 14a and 14b converging radially inwardly of the pipe coupling 10 when the separator 14 is mounted on the stop collar portion 10a as shown in FIG. 4. The separator 14 has a groove 14c generally corresponding in cross sectional shape to that of the stop collar portion 10a, but chamfered as at 14d and 14e. Further, the separator 14 also has a pair of relatively thin oppositely extending portions 14f and 14g with tapered end surfaces 14h and 14i generally parallel respectively to the side surfaces 14a and 14b.

In the attachment of the separators 14 to the stop collar portion 10a of a pipe coupling 10, the chamfered portions 14d and 14e of each separator are spread apart and a portion 14j of the separator defining the bottom of the groove 14c is flexed while the stop collar portion 10a is inserted in the groove 14c. The separator 14 is then released and tends to regain its free-state shape, whereby gripping surfaces 14k and 14m defining the sides of the groove 14c grip the stop collar portion 10a. Preferably, adhesive is applied in the groove 14c before application of the separator to the stop collar portion 10a.

FIG. 1 shows end portions of a pair of pipes 16 and 18 to be inserted in the coupling 10. FIG. 4 shows the pipes 16 and 18 engaging a separator 14 and prevented thereby from further insertion in the pipe coupling 10. However, upon thermal expansion of the pipes 16 and 18 when they are engaging the elastomeric separators 14, the separators will be compressed and prevent damage to the pipes or coupling.

Various modifications may be made in the structure shown and described without departing from the spirit and scope of the invention.

I claim:

1. A pipe coupling (10) comprising a generally cylindrical main body portion (10b) and an internal annular stop collar portion (10a), and a plurality of elastomeric pipe separators (14) separate from each other and initially separate from the stop collar portion (10a), the pipe separators (14) being interlockable with the stop collar portion (10a) in any desired arcuately spaced relationship with each other therealong.

2. A pipe coupling (10) comprising a generally cylindrical main body portion (10b) and an internal annular stop collar portion (10a) of generally trapezoidal cross section and having side surfaces (10c and 10d) diverging radially inwardly of the pipe coupling (10), and a plurality of elastomeric pipe separators (14) separate from each other and initially separate from the stop collar portion (10a), the pipe separators (14) being attachable to the stop collar portion (10a) in any desired arcuately spaced relationship with each other therealong, each pipe separator (14) having a groove (14c) of generally trapezoidal cross section and respective portions of the stop collar portion (10a) being receivable in the grooves (14c), the groove (14c) of each pipe separator (14) being partially defined by a pair of opposed gripping surfaces (14k and 14m) for respectively gripping the side surfaces (10c and 10d) of the stop collar portion (10a).

3. A pipe coupling (10) as claimed in claim 1 or claim 2 wherein each of the elastomeric pipe separators (14) has a pair of opposed side surfaces (14a and 14b) converging radially inwardly of the pipe coupling (10).

* * * * *